United States Patent [19]

Harada

[11] Patent Number: 4,950,091

[45] Date of Patent: Aug. 21, 1990

[54] ROD ANTENNA CONTROL SYSTEM FOR AUTOMOBILES

[75] Inventor: Takuji Harada, Kanagawa, Japan

[73] Assignee: Harada Kogyo Kabushiki Kaisha, Tokyo, Japan

[21] Appl. No.: 293,363

[22] Filed: Jan. 4, 1989

[51] Int. Cl.[5] .......... H02P 5/06

[52] U.S. Cl. .......... 388/815; 388/920; 318/650; 318/468

[58] Field of Search .......... 361/31, 18; 318/599, 318/345 C, 345 G, 306–317, 568–567, 600–603, 650, 445–447, 449, 466–469; 343/903, 901; 388/806, 809, 811, 815, 819, 823, 920

[56] References Cited

U.S. PATENT DOCUMENTS

| | | | |
|---|---|---|---|
| 3,959,713 | 5/1976 | Davis et al. | 361/18 |
| 4,052,625 | 10/1977 | Cameron | 361/31 |
| 4,203,059 | 5/1980 | Kraus | 318/446 |
| 4,215,759 | 8/1980 | Diaz | 318/587 |
| 4,306,265 | 12/1981 | Kuntner et al. | 361/31 |
| 4,330,782 | 5/1982 | Hashimoto et al. | 318/468 X |
| 4,339,697 | 7/1982 | Franz | 318/139 |
| 4,404,612 | 9/1983 | Hughes et al. | 361/31 |
| 4,514,670 | 4/1985 | Fassel et al. | 318/467 |
| 4,532,567 | 7/1985 | Kode | 361/31 |
| 4,649,398 | 3/1987 | Yamamoto et al. | 318/603 X |
| 4,651,070 | 3/1987 | Truman et al. | 388/814 X |
| 4,730,152 | 3/1988 | Foust et al. | 318/603 |
| 4,819,122 | 4/1989 | Gontowski, Jr. | 361/18 |
| 4,864,322 | 9/1989 | Yamamoto et al. | 318/603 X |

*Primary Examiner*—William M. Shoop, Jr.
*Assistant Examiner*—David Martin
*Attorney, Agent, or Firm*—Koda & Androlia

[57] ABSTRACT

A rod antenna control system for automobiles wherein electric current is supplied continuously to a motor which pushes up an antenna motor when a current below a predetermined value is flowing to the motor, and the current is supplied intermittently to the motor when a current above a predetermined value flows to the motor, and whether or not the electric current is over or below the predetermined value is determined by integrating the motor current for certain period of time and comparing such integrated value to the predetermined value.

5 Claims, 1 Drawing Sheet

FIG.1
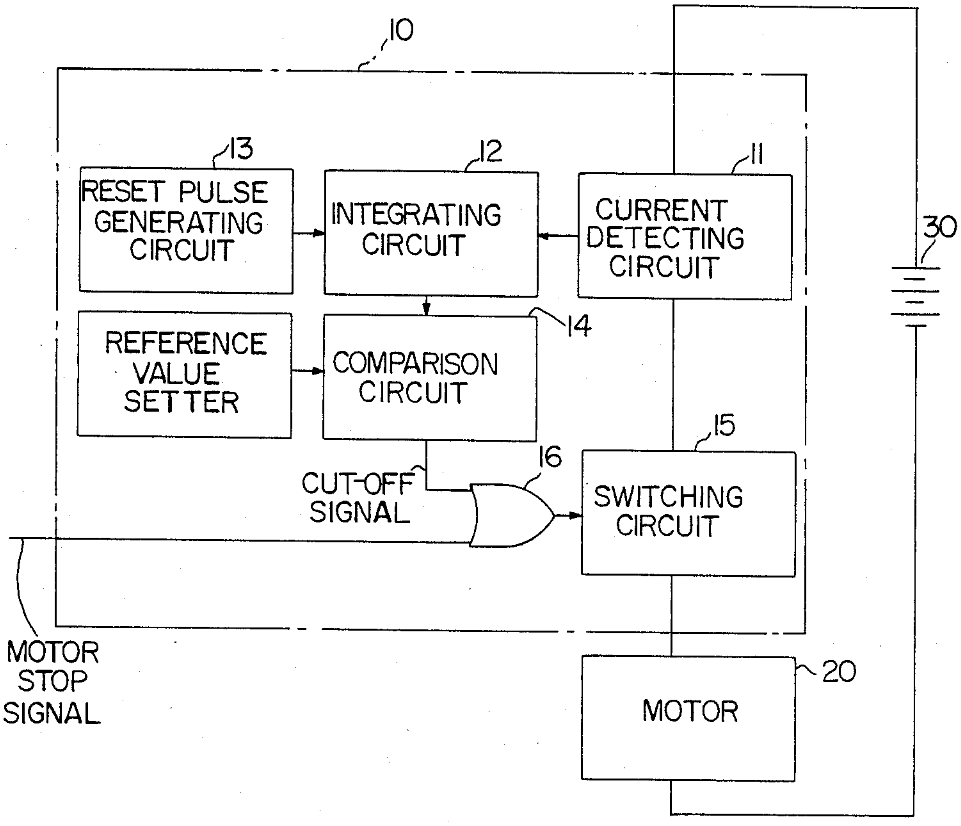
FIG.2A
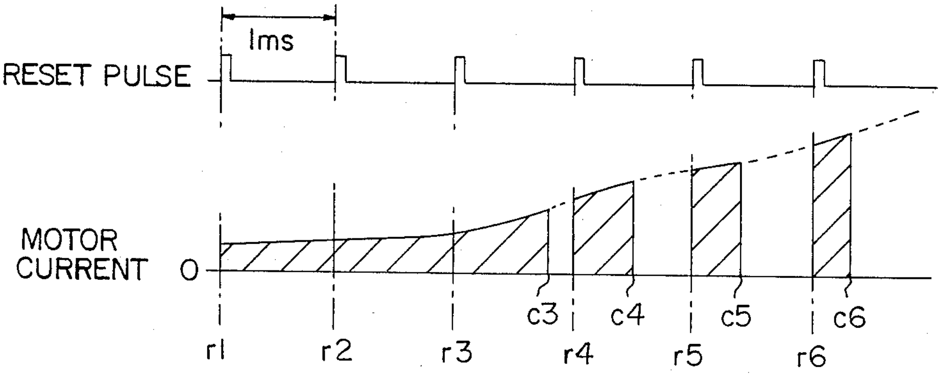
FIG.2B

ROD ANTENNA CONTROL SYSTEM FOR AUTOMOBILES

BACKGROUND OF THE INVENTION

1. Field of the Invention

The present invention relates to a rod antenna control system for automobiles with a motor-driven mechanism to push up an antenna rope to extend a rod antenna for an automobile.

2. Prior Art

In order to extend and retract a rod antenna for an automobile, an antenna rope made of nylon, etc. is often used. One end of the rope is connected to the tip of a rod antenna, and the rope is driven by a motor so as to be pushed up and down so that the antenna rod is extended and retracted.

In this type of conventional system, however, the antenna cannot be easily extended when it is covered with ice during icy season. Accordingly, the system is designed so that a push-up power above a predetermined value can be exerted so as to assure that the antenna can be extended. In other words, the system uses a motor which is capable of insuring sufficient amount of push-up power even if the voltage of the automobile battery, which is normally 12 V, decreases to about 9 V.

However, when the voltage of the battery is raised to 16 V, for example, a problem would occur in that a very great push-up force is applied to the antenna rope, causing the antenna rope to buckle and break when the rod antenna reaches its highest position.

In other words, since the power applied to the motor increases in proportion to the square of the voltage and the antenna push-up power also increases in proportion to the square of the voltage, the antenna rope ends up buckling and eventually breaking during a voltage surge to, for example, 16 volts.

SUMMARY OF THE INVENTION

Accordingly, it is a primary object of the present invention to solve the problems found in conventional system.

Such an object of the present invention is accomplished by the unique structure of the rod antenna control system of this invention wherein electric current is supplied continuously to an antenna rope push-up motor when a current below a predetermined value is flowing to the motor, and the electric current being supplied intermittently to the motor when a current above a predetermined value flows to the motor.

Since, according to the present invention, electric current is continuously supplied to the antenna rope push-up motor when a current below a predetermined value is flowing to the motor, and then current is supplied intermittently to the motor when a current above a predetermined value flows to the motor, no excessive push-up force is applied to the antenna rope even when the battery voltage is higher than usual so that the antenna rope does not buckle and break.

BRIEF DESCRIPTION OF THE DRAWINGS

FIG. 1 is a block diagram showing an embodiment of the rod antenna control system of the present invention.

FIG. 2 is a graph showing a reset pulse and a motor current the embodiment of FIG. 1.

DETAILED DESCRIPTION OF THE INVENTION

In FIG. 1, the embodiment shown therein includes a chopper circuit 10, a motor 20 for pushing up an antenna rope made of synthetic resins such as nylon, etc., and a battery 30.

The chopper circuit 10 is a circuit which supplies electric current continuously to the motor 20 when a current below a predetermined value is flowing to the motor 20 and supplies current intermittently to the motor 20 when a current above a predetermined value flows to the motor 20.

More specifically, the chopper circuit 10 includes a current detecting circuit 11 that detects the current flowing to the motor 20, an integrating circuit 12 that integrates the detected current for a predetermined period of time, and a reset pulse generating circuit 13 which generates reset pulses at such predetermined time interval.

The chopper circuit 10 further includes a comparison circuit 14 which compares the integrated current value (obtained by an equation: current value times value during a predetermined period of time) obtained by the integrating circuit 12 to a predetermined reference value, an OR circuit 16, and a switching circuit 15 which opens and closes the current paths of the motor 20.

The reset pulse generating circuit 13 generates reset pulses every 1 ms as shown at (A) of FIG. 2. The integrating circuit 12 and the comparison circuit 14, respectively, includes, for example, a capacitor that charges an electric charge in proportion to the output signals of the current detecting circuit 11, and a discharge circuit that discharges such electric charge charged by the capacitor upon receiving the reset pulse.

The cut off signal outputted by the comparison circuit 14 is "1" when the integrated value is below the reference value, and when the integrated value is higher than the reference value, it becomes "0."

The switching circuit 15 is composed of transistors, semiconductors such as thyristors, etc.

The OR circuit 16 receives the cut-off signal sent from the comparison circuit 14 and the motor-stop signal sent from the outside of the chopper circuit 10. This motor-stop signal (which is usually called a "motor-drive signal") becomes "1" when it stops the motor 20 and becomes "0" when it runs the motor 20. The circuit which generates the motor-stop signal is an ordinary motor-drive circuit.

FIG. 1 illustrates a circuit for extending the antenna, and a circuit for retracting the antenna (a circuit for reversely-rotating the motor 20) is omitted in FIG. 1.

The operation of the above-described embodiment will be explained below.

In FIG. 2, the graph labeled (B) shows the changes in current flowing through the motor 20. In this diagram, the voltage of the battery 30 is low at the left end, and the voltage of the battery 30 gradually increases toward the right side.(In reality, the battery voltage would not increase as fast as shown here, but for the convenience of explanation, the time is shortened.)

The dotted line at (B) shows changes in the motor current of a conventional system which does not use a chopper circuit 10.

First, assume that the motor-stop signal is consecutively "0" following the point r1 (in other words, commands to drive the motor 20 are continually generated).

Reset pulses are generated at 1 ms intervals at points r1, r2, r3, r4, r5, and r6; and immediately after these reset pulses are generated, the integrating circuit 12 integrates the current detected by the current detecting circuit 11. The integrated value obtained in the integrating circuit 12 and the predetermined reference value are then compared in the comparison circuit 14.

Between points r1 and r2 as well as r2 and r3, the integrated values are smaller than the predetermined reference value. Thus, the comparison circuit 14 outputs a signal "0," and since the motor-stop signal is also "0," the switching circuit 15 is activated, and current is supplied continuously to the motor 20 between r1 and r3.

If the voltage of the battery raises to 15 or 16 volts, for instance, between r3 and c3 wherein the integrating circuit 12 is performing integration, the integrated value becomes higher than the reference value, and therefore, the comparison circuit 14 outputs a signal "1." Consequently, the 0R circuit 16 outputs a signal "1," and the switching circuit 15 is closed. Then, since the comparison circuit 14 continues outputting the signal "1" until r4 where the next reset pulse is outputted, the current to the motor 20 is interrupted until r4.

At r4, integration is resumed by the reset pulse, and the comparison circuit 14 outputs signal "0." As a result, the switching circuit 15 is closed momentarily, and current is supplied to the motor 20.

When the reset pulse is outputted from the reset pulse generating circuit 13 at r4, integration starts again in the integrating circuit 12. If the integrated value by the integrating circuit 12 at c4 exceeds a predetermined reference value, the comparison circuit 14 outputs a signal "1," and the current to the motor 20 is interrupted between points c4 and r5.

In the same manner as described above, the current supply to the motor 20 is re-established at r5 and is interrupted at c5, and re-established at r6 and interrupted at c6. This operation repeats hereafter. Thus, the current is supplied intermittently to the motor 20 when the integrated value exceeds the reference value.

As described above, when a current greater than a predetermined current value flows to the motor 20, the motor 20 is supplied with intermittent current. Accordingly, even when the battery voltage becomes higher than normal, excessive push-up force is not applied to the antenna rope. Thus, the antenna rope will not buckle and break.

Even when the current is intermittently supplied to the motor 20 as stated above, the motor current flows smoothly due to mechanical inertia. Moreover, since the intermittent periods are short, the revolving action of the motor is not affected by the motor current.

The above-described embodiment limits excess current under normal circumstances and performs on-off operation of the power supply using semiconductors. Also, when a semiconductor is "on" during the on-off operation, the drop in forward voltage is small, and the power consumed by the semiconductor is small even though the current is large. When, however, semiconductors are used as a resistance to limit current, the voltage of the semiconductors decreases and a large amount of power is consumed by the semiconductors. Thus, in this case it is necessary to either use a large capacity semiconductor or enlarge a heat radiator, both of which increases the manufacturing cost considerably.

The amount of the current flowing to the motor 20 increases not only when the voltage from the battery 30 is increased as mentioned above, but also when the motor 20 is temporarily locked due to ice building up on the rod antenna. Even in such cases, according to the embodiment, motor current does not exceed the predetermined value. In this case, since the current flowing to the motor 20 is sufficient, the rod antenna can be raised by breaking the ice.

A chopper circuit different from the circuit 10 described in the embodiment may be used, and it is possible to set the reset pulse at intervals other than 1 ms. Also, the reference value at the comparison circuit 14 may be changed as required.

Furthermore, a large amount of current usually flows to the motor 20 at the start-up time, and this current is detected so that current flows to the motor 20 intermittently by detecting such a current. In order to prevent this, two different reference values (the predetermined current value), one which is at the start-up time of the motor 20 and the other which is after the motor 20 has been started, may be established separately as the abovementioned reference values (the predetermined current values) in a manner such that the reference value at the time of starting-up the motor 20 is higher than the other which is the value after the motor 20 has been started. Naturally, only one value may be established as the reference value (the predetermined current value).

Thus, in the rod antenna control system for automobiles of this invention wherein an antenna is pushed up so as to be extended by a motor-driven mechanism, excessive push-up force is not applied to the antenna rope even when the voltage of the car buttery is higher than normal. Therefore, buckling and breaking of the antenna rope can be prevented.

I claim:

1. A rod antenna control system for an automobile wherein an electric motor is used to push up an antenna rope to extend a telescopic rod antenna, said antenna control system comprising:

a means for sensing electric current supplied to said electric motor;

a means for determining when the sensed electric current is greater than a predetermined current value; and a means for intermittently supplying current to said electric motor when said sensed current is determined to be greater than said predetermined current value;

whereby said current is continuously supplied to said electric motor when said current is below said predetermined value and said current is intermittently supplied to said motor when said current is above said predetermined value.

2. A rod antenna control system according to claim 1, wherein said means for determining comprises:

a means for setting a predetermined time interval; and a means for repeatedly integrating said sensed current for said predetermined time interval.

3. A rod antenna control system according to claim 1, wherein said means for determining comprises:

a means for setting said predetermined current value; and a means for comparing said sensed current value with said set predetermined current value.

4. A rod antenna control system according to claim 3, wherein said predetermined current value in said setting means is higher during start-up of said electric motor than said predetermined current value after start-up of said electric motor.

5. A rod antenna control system for automobiles wherein a motor is driven by a battery to push up an antenna rope to extend an telescopic rod antenna, said antenna control system comprising:

a current detecting circuit which is connected to said battery and detects said current flowing through said motor;

an integrating means which integrates said current detected by said current detecting circuit for a predetermined period of time;

a reset pulse generating circuit which generates a reset pulse for each of said predetermined period of time;

a comparison circuit which compares said integrated current value to a predetermined reference value;

an OR gate connected to said comparison circuit; and a switching circuit connected to said motor, said switching circuit opening and closing an electrical path to said motor;

whereby said current is continuously supplied to said motor when said current is below said predetermined value and said current is intermittently supplied to said motor when said current is above said predetermined value.

* * * * *